United States Patent
Hudek

(10) Patent No.: US 9,158,839 B2
(45) Date of Patent: Oct. 13, 2015

(54) SYSTEMS AND METHODS FOR TRAINING AND CLASSIFYING DATA

(75) Inventor: Alexander Karl Hudek, Toronto (CA)

(73) Assignee: DiligenceEngine, Inc., Toronto, Ontario (CA)

( * ) Notice: Subject to any disclaimer, the term of this patent is extended or adjusted under 35 U.S.C. 154(b) by 314 days.

(21) Appl. No.: 13/592,811

(22) Filed: Aug. 23, 2012

(65) Prior Publication Data

US 2014/0058983 A1  Feb. 27, 2014

(51) Int. Cl.
*G06F 15/18* (2006.01)
*G06F 17/30* (2006.01)
*G06N 5/02* (2006.01)
*G06N 99/00* (2010.01)

(52) U.S. Cl.
CPC ............ *G06F 17/30707* (2013.01); *G06N 5/02* (2013.01); *G06N 99/005* (2013.01)

(58) Field of Classification Search
None
See application file for complete search history.

(56) References Cited

U.S. PATENT DOCUMENTS

2009/0125461 A1* 5/2009 Qi et al. ......................... 706/12
2011/0258188 A1* 10/2011 AbdAlmageed et al. ..... 707/736

OTHER PUBLICATIONS

Raymond, C et al. "Generative and discriminative algorithms for spoken language understanding." Interspeech. 2007. [retrieved Jul. 24, 2014]. [retrieved from univ-avignon.fr].*
Nguyen, N et al. "Comparisons of sequence labeling algorithms and extensions." Proceedings of the 24th international conference on Machine learning. ACM, 2007. [retrieved Jul. 24, 2014]. [retrieved from wustl.edu].*
Settles, B. et al. "An analysis of active learning strategies for sequence labeling tasks." Proceedings of the Conference on Empirical Methods in Natural Language Processing. Association for Computational Linguistics, 2008. [retrieved Jul. 24, 2014]. [retrieved from wisc.edu].*
Lafferty, John D., et al., "Conditional random fields: Probabilistic models for segmenting and labeling sequence data," ICML, pp. 282-289, Morgan Kaufmann, 2001.
Manning, Chris et al., "Foundations of Statistical Natural Language Processing," MIT Press. Cambridge, MA: May 1999.

* cited by examiner

*Primary Examiner* — Kakali Chaki
*Assistant Examiner* — Eric Nilsson
(74) *Attorney, Agent, or Firm* — Lowenstein Sandler LLP

(57) ABSTRACT

A mechanism for training and classifying data is disclosed. The method includes receiving a data set having at least a first annotation and at least a second annotation. The first annotation and the second annotation represent characteristics within the data set. The method also includes determining a first identifier from the first annotation and a second identifier from the second annotation and associating the first identifier to the second identifier to generate a joined identifier. The method also includes computing feature weights and transition weights for the annotated data set based on the at least a first identifier, at least a second identifier, and at least a joined identifier and transitions between each of the first, the second and the joined identifiers. The method further includes receiving a second un-annotated data set and classifying the second data set based on the computed feature weights and the transition weights.

20 Claims, 6 Drawing Sheets

| Class Label | Annotated Sentence |
|---|---|
| governing-law | AGREEMENT       INTERPRET<br>This agreement shall be construed and enforced in<br>ACCORD   LAW   JURIS   STATE<br>accordance with the laws of the State of New York ,<br>                 INTERPRET<br>and nothing herein contained shall be construed as<br>      JURIS<br>doing business in any other state . |
| background | AGREEMENT<br>If any provision of this agreement in any way<br>    LAW    STATE<br>contravenes the laws of New York , such provision<br>                      AGREEMENT<br>shall be deemed not to be a part of this agreement<br>  JURIS<br>in that jurisdiction , and the parties agree to<br>remain bound by all remaining provisions . |

Figure 2

SYSTEMS AND METHODS FOR TRAINING AND CLASSIFYING DATA

FIELD OF THE INVENTION

The present invention relates generally to a method and system for training and classifying data, and more particularly to building and training an annotated data model and using the annotated model to classify data.

BACKGROUND OF THE INVENTION

Training and classification of data is a fundamental problem shared by many application domains such as natural language, images, audio or genome data.

Traditional training and classification methods represent data as a set of features. For instance, to classify a document one might use word frequencies as features. A common method to incorporate some sequential information is the use of word grams. For example, instead of using single words as features, one may additionally use pairs or triples of adjacent words. While this works well when a lot of data is available (e.g. when classifying a document), it is not effective on shorter pieces of data such as sentences or paragraphs. Further, the majority of sequential information and large-scale structure is discarded when one represents data as a set of n-gram features.

A recent example of this technique represents rules as a set of words. A rule is said to pass and imply a class if all words are present in a data instance. Rules are learned by using one of the many algorithms developed to solve a mathematical problem called the frequent itemset problem. Each learned frequent item set is a rule. Rule based systems are often combined with other types of classifiers.

The training and classification methods described above do not model the large scale structure of the sequence, and this can lead to ambiguities and mis-classification. One such ambiguity may occur when text of a data is conceptually similar but not phrased the exact same way. Another ambiguity may occur when only specific words in a text are identified without considering the transition words between the identified words. Thus, there is a need in the art to provide an improved system and method for training and classifying data.

More recently developed learning methods treat data as sequences. These include hidden Markov models (HMMs) and conditional random fields (CRFs). Such methods typically focus on extracting information out of a sequence rather than classifying the sequence as a whole. Variations on these techniques (e.g. hidden CRFs) exist for classifying sequences. Some common non-sequential classification methods are equivalent to extremely simple HMM or CRF models. Typical application of these methods as a classifier is in image classification, although it can also be used to classify other types of data.

Currently existing methods that are designed for sequential data require a rough model of sequence structure to be supplied or learned. For text data, it is not obvious how one should build models for the purpose of classification and it is difficult to learn good models automatically.

BRIEF DESCRIPTION OF THE DRAWINGS

The present invention will be more readily understood from the detailed description of exemplary embodiments presented below considered in conjunction with the attached drawings, of which:

FIG. 2 is a table illustrating an example of annotated data according to one or more embodiments of the present invention;

Figure 1:
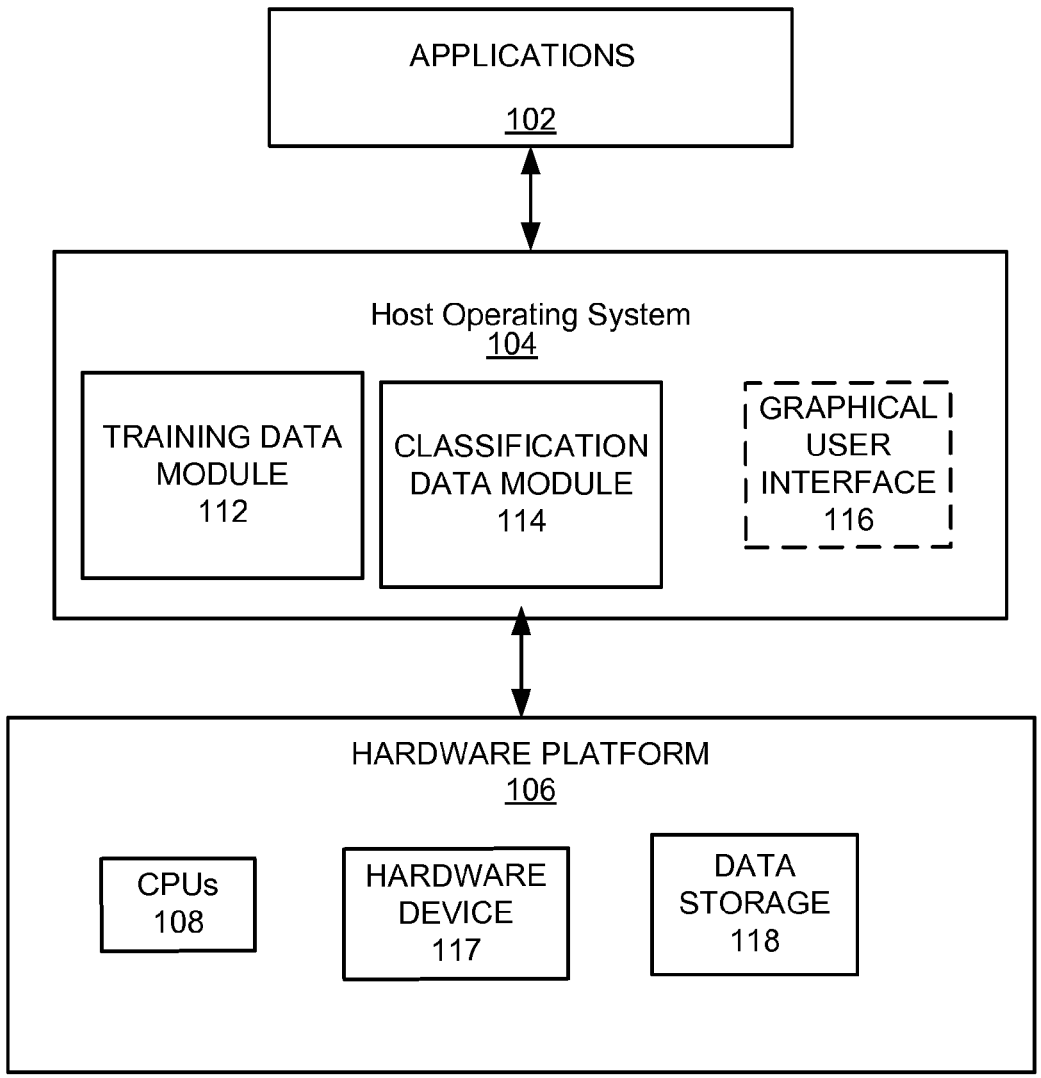
FIG. 1 is a block diagram of one embodiment of a training and classification data system.

It is to be understood that the attached drawings are for purposes of illustrating the concepts of the invention and may not be to scale.

DETAILED DESCRIPTION OF THE INVENTION

The present invention provides an improved mechanism to train and classify data in order to generate a user searchable document that is simple, fast and accurate. In one embodiment, the data is set of sentences having a plurality of words that are annotated and further identified to compute a probability of words likely to occur in the sentence. As such, a trained annotated data model is generated. In another embodiment, the trained annotated model is used to classify a second data (different from the data) of sentences having a plurality of words that are un-annotated. The classified second data functions as the user searchable document. The user utilizes the user searchable document to search for the text that is relevant to a pre-defined concept in several hundreds and thousands of sentences in a plurality of documents.

Embodiments of the invention provide for a system and method for training and classifying data. In one embodiment, the method includes receiving a data set annotated with at least a first annotation and at least a second annotation. The first annotation and the second annotation represent a characteristic within the data set. The method also includes determining a first identifier from the first annotation and a second identifier from the second annotation. The method also includes associating the first identifier to the second identifier to generate a joined identifier. The method also includes computing feature weights and transition weights for the annotated data set based on at least a first between each of the first, the second and the joined identifiers. The method further includes receiving a second data set, wherein the second data set is un-annotated, and classifying the second data set based on the computed feature weights and the transition weights.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "joining", "computing", "determining", "classifying", "extracting" "comparing", "categorizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the present invention provide systems and methods for training and classifying data (the system herein referred to as the "Train and Classify Data System" or TCDS) in a data set. In one embodiment, the data set is sequential data. The term "annotation" is a characteristic within the data set. In one embodiment, the annotation represents a critical characteristic within the data set. Some examples of annotation in a natural language include, but are not limited to, a named entity (e.g., person or place), a simple single word, and a group of words. The term "identifier" is defined as a portion of the annotation that identifies the annotation.

FIG. 1 is a block diagram of one embodiment of a TCDS system 100 in which embodiments of the present invention may be implemented. In one embodiment, the TCDS 100 may be a host machine such as, for example, a server computer, a gateway computer or any other suitable computer system that is configurable for operating as a host. As illustrated in FIG. 1, the TCDS system 100 may include a hardware platform 106, on top of which runs a host OS 104 that executes one or more software application programs 102 (i.e., applications 102). The host OS 104 may include Microsoft Windows™, Linux™, Solaris™, Mac™ OS or any other suitable operating system for managing operations on the TCDS system 100.

The hardware platform 106 may include one or more central processing units (CPUs) 108 and data storage 118. In one embodiment, the data storage 118 comprises one or more hardware and software devices, which may be located internally and externally to the computer system 100. Examples of data storage 118 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, Blue Ray drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

In some embodiments, the host OS 104 includes a training data (TD) module 112 configured to build and train data in a data set. In one embodiment, the TD module 112 integrates with applications 102 to annotate the data set. In another embodiment, the TD module 112 integrates with applications 102 to build and train an annotated data model based on the annotated data set. The operating system 104 may also include a graphical user interface (GUI) 116 configured to make the trained annotated data model easily available to a user for use. In some embodiments, the host OS 104 includes a classification data module (CD) 114 to classify a second data set. In the embodiments of the present invention, the second data set is different from the data set. In one embodiment, the second data set is not annotated. In one embodiment, the CD module 114 uses the annotated data model generated by the TD module 112 to classify the second data set.

In one embodiment, the data set is sequential data. Sequential data is data consisting of a sequence. In the embodiment discussed, the data set is a text; however, one of ordinary skill will appreciate that data can be image, video, audio etc. In one embodiment, the data set includes a plurality of sentences having a plurality of words.

FIG. 2 is a table illustrating an example of annotated data of at least two sentences according to one or more embodiments of the present invention. As illustrated in FIG. 2, words in the first sentence 202 and a second sentence 204 are annotated in all-caps, examples of which include, but are not limited to, "AGREEMENT", "INTERPRET", "ACCORD", "LAW" etc. Also, the first sentence 202 and the second sentence 204 are generated with a class label is illustrated in an exemplary table 200 in FIG. 2. As shown in FIG. 2, the first sentence 202 is assigned with a "background" 206 as a class label and the second sentence 204 is assigned with a "governing-law" 208 as the class label. In one embodiment the "governing-law" label 208 is a foreground label. In one embodiment, the data in the foreground label 208 is considered as relevant data and data in the background label 206 is considered as irrelevant data. In one embodiment, the data is annotated using a heuristic algorithm. In another embodiment, the data is annotated by a user. Although, only two sets of sentences of the annotated data is shown one of ordinary skill would appreciate that annotated data set may include hundreds and thousands of such sentences.

Figure 3:
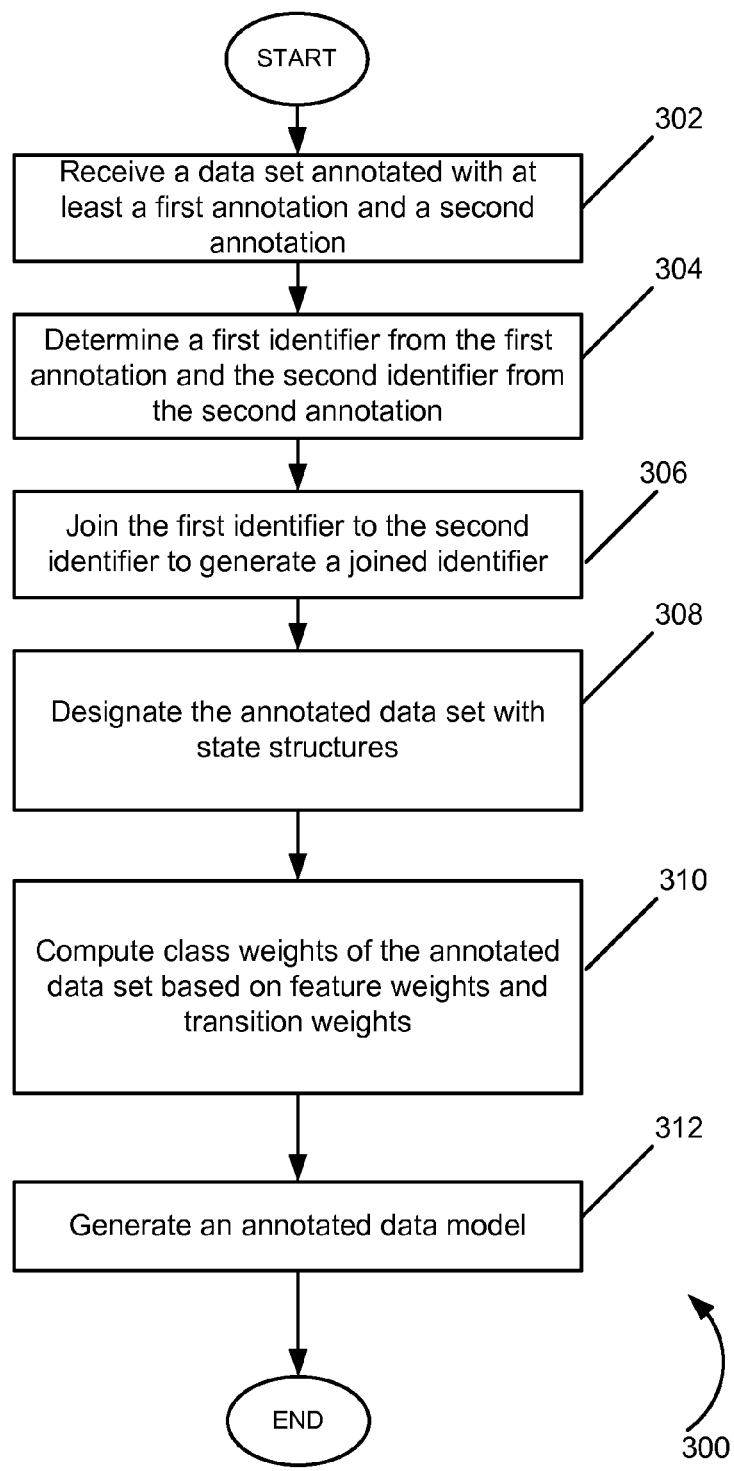
FIG. 3 is a flow chart detailing the steps of an exemplary process for building and training annotated data model according to one or more embodiments of the present invention.

FIG. 3 is a flow diagram illustrating a method 300 for building and training an annotated data model based on the annotated data set generated in FIG. 2 in accordance with an embodiment of the present invention. In the embodiment discussed, the annotated data set is a text; however, one of ordinary skill will appreciate that data can be image, video, audio etc. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the training data module 112 of FIG. 1.

The method 300 begins at block 302 where the data set annotated with at least a first annotated data and a second annotated data is received. In one embodiment, the data set includes the two such sets of data annotated sentences as illustrated in the FIG. 2. As illustrated in FIG. 2, the first sentence 202 is categorized with a governing-law class label 206 and the second sentence 204 is categorized with a background class label 208 and each of the sentences included annotated data 210 in all-caps such as "AGREEMENT", "INTERPRET", "ACCORD", "LAW" etc. In one embodiment, each of the annotated data is in close proximity to one another. In one embodiment, a first annotated data is adjoining to the second annotated data. In another embodiment, the first annotated data is at least one word away from the second annotated data. In one embodiment, the word "AGREEMENT" is the first annotated data 210a and "INTERPRET" is the second annotated data 210b.

Figure 4:
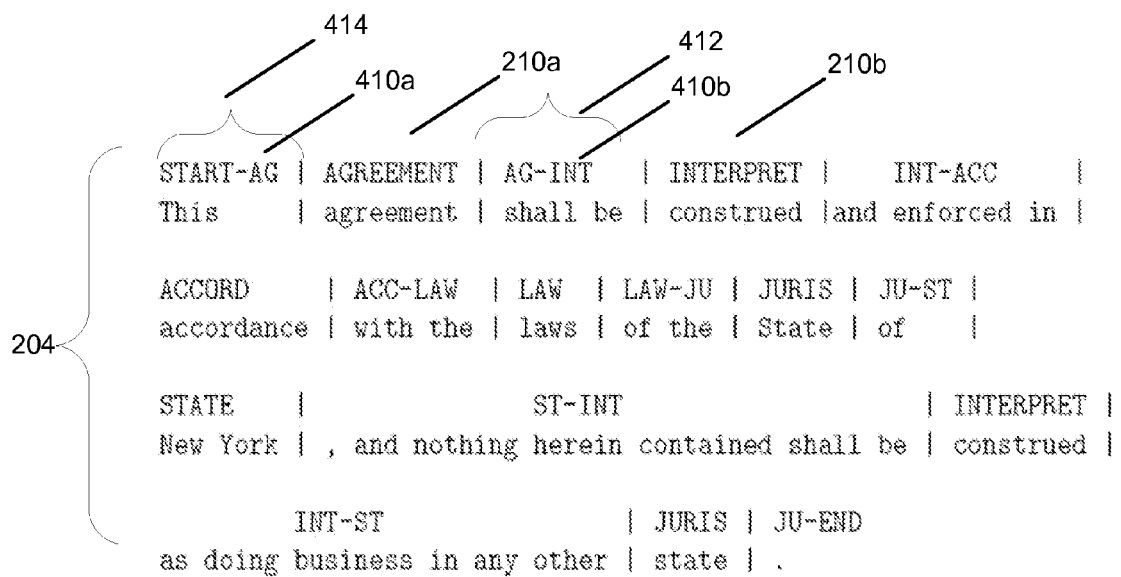
FIG. 4 is an example of the annotated data of FIG. 2 having the identifiers and the joined identifiers according to another embodiment of the present invention.

At block 304, a first identifier from the first annotated data 210a and a second identifier from the second annotated data 210b are determined. In one embodiment, the first identifier is determined by extracting at least two letters from the word of the first annotated data 210a and similarly the second annotated data is determined by extracting at least two letters from the word of the second annotated data 210b. An exemplary of the second sentence 204 of FIG. 2 having a first identifier 410a and a second identifier 410b is illustrated in FIG. 4. As such, the first identifier 410a for the first annotated data "AGREEMENT" 210a is AG and the second identifier 410b for the second annotated data "INTERPRET" 210b is INT as illustrated in FIG. 4.

At block 306, the first identifier 410a is associated with the second identifier 410b to generate a joined identifier 412. In one embodiment, the joined identifier 412 includes the first identifier 410a and the second identifier 410b separated by a dash. As illustrated in FIG. 4 the joined identifier 412 is AG-INT. At block 408, the joined identifier 412 is placed between the first annotated data 210a and the second annotated data 210b. Referring back to FIG. 4, the first identifier, AG 410a corresponds to the first annotated data, "AGREEMENT" 210a and the second identifier, INT 410b corresponds to the second annotated data, "INTERPRET", 210b. As such the joined state AG-INT 412 is placed between the first annotated data "AGREEMENT" 210a and the second annotated data "INTERPRET" 210b.

At block 308, the annotated data set is designated with the state structures. In one embodiment, a state structure "START" is identified as the beginning of the annotated sentence and state structure "END" is identified as an end of the annotated sentence for the purpose of generating a joined state. For example of FIG. 4, the first identifier AG 410a is designated with a START state to generate a joined state, START-AG 414 and identifier JU is designated with an END state to generate a joined state JU-END. It is known to one of ordinary skilled in the art, in other examples, the generated joined START state may include annotated data such as START-AGREEMENT if the first annotated data, "AGREEMENT" 210a occurs in the beginning of the annotated sentence. Similarly, in other examples, the generated joined END state may include annotated data such as INTERPRET-END if the second annotated data "INTERPRET" 210b occurs in the end of the annotated sentence. At block 310, class weights of the annotated data set are computed based on feature weights and transition weights. In the example of FIG. 4, class weights are computed for the first identifier 410a, the second identifier 410b and the joined identifier 412 and the transition between each of the first, second and the joined identifiers 410a, 410b and 412 respectively. In some embodiments, feature weights characterize the words that occur within each of the first, second, and joined identifiers 410a, 410b and 412 respectively.

In some embodiments, the transition weights characterize the state transitions that occur between each of the first identifier 410a, the second identifier 410b and the joined identifier 412. In one embodiment, a feature itself is a text value associated with the words in the sentence. As an example, the feature weight is computed by counting the frequency of a feature within its annotation and dividing it by the total number of features that occurred within that annotation. So, for example, the feature weight for the feature "enforced", annotated as INT-ACC in FIG. 4, equals the number of times "enforced" annotated as INT-ACC is observed divided by the total number of features annotated as INT-ACC. In another embodiment, the transition weight is computed by counting the frequency of transitions between a pair of identifiers and dividing it by the total number of transitions that occur within the data set after the join identifiers are generated. So, for example, in FIG. 4, count the number of times the transition occurs from "AGREEMENT" 210a to "AG-INT" 412 within the annotated sentence and divide by total number of transitions. Other mechanisms to determine class weights are disclosed by John D. Lafferty, Andrew McCallum, and Fernando C. N. Pereira in "Conditional random fields: Probabilistic models for segmenting and labeling sequence data," *ICML*, pages 282-289, Morgan Kaufmann, 2001. As a result, at block 312, an annotated data model is generated for the data set.

Figure 5:
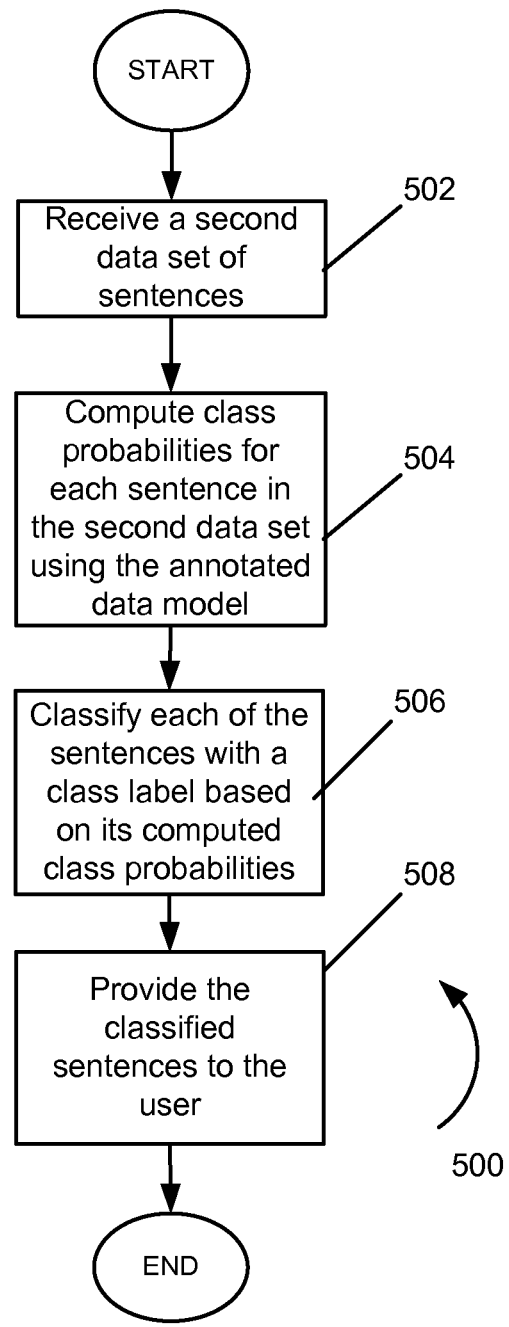
FIG. 5 is a flow chart detailing the steps of an exemplary process for classifying data using a trained annotated data model generated in FIG. 3 according to a further embodiment of the present invention.

FIG. 5 is a flow diagram illustrating a method 500 for classifying a second data set using the annotated data model generated in FIG. 3 in accordance with an embodiment of the present invention. As discussed above, the second data set is different from the data set. Also, the second data set is not annotated. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by the classification data module 114 of FIG. 1.

In one embodiment, the second data set is a sequential data. In the embodiment discussed, the second data set is a text; however, one of ordinary skill will appreciate that data can be image, video, audio etc. The method 500 begins at block 502 where a second data set including a set of sentences is received. In one embodiment, each of the sentences includes a plurality of words. At block 504, class probabilities are computed for each of the sentences within the second data set using the annotated data model generated in FIG. 3. In one embodiment, the class probability is computed based on the class weights consisting of feature weights and the transition weights generated in the annotated data model in FIG. 3. In this embodiment, the probability that a sequence position has a particular label (called the marginal probability) is computed for a starting state and assigned the label with maximum probability. As such, a class label to the sequence is assigned. Such mechanisms to determine class probabilities is disclosed by John D. Lafferty, Andrew McCallum, and Fernando C. N. Pereira in "Conditional random fields: Probabilistic models for segmenting and labeling sequence data," *ICML*, pages 282-289, Morgan Kaufmann, 2001. Another mechanism to determine class probability is to compute the optimal Viterbi labeling of the sequence which would assign an appropriate class label to the special starting state as part of its returned sequence label. The class probability is the probability of the labeling. Such mechanism is disclosed by Chris Manning and Hinrich Schütze, *Foundations of Statistical Natural Language Processing*, MIT Press. Cambridge, Mass.: May 1999.

At block 506, each of the sentences in the second data set is classified with a class label based on its computed class probabilities. In one embodiment, if the computed class probability of the sentence within the second data set is high for the class weights of the data set with a background class, then such sentence within the second data set is assigned a background class label. In another embodiment, if the computed class probability of the sentence within the second data set is high for class weights of the data set with a foreground class, then such sentence within the second data set is assigned with the foreground class label. In a further embodiment, the foreground class label is a "governing-law" label. At block 508, the classified sentences in the second data set are provided to a user. In one embodiment, the classified sentences in the second data set function as a searchable document for the user to search for the text that is relevant to a pre-defined concept. In the example discussed above, the pre-defined concept would be the "governing law of a document".

Figure 6:
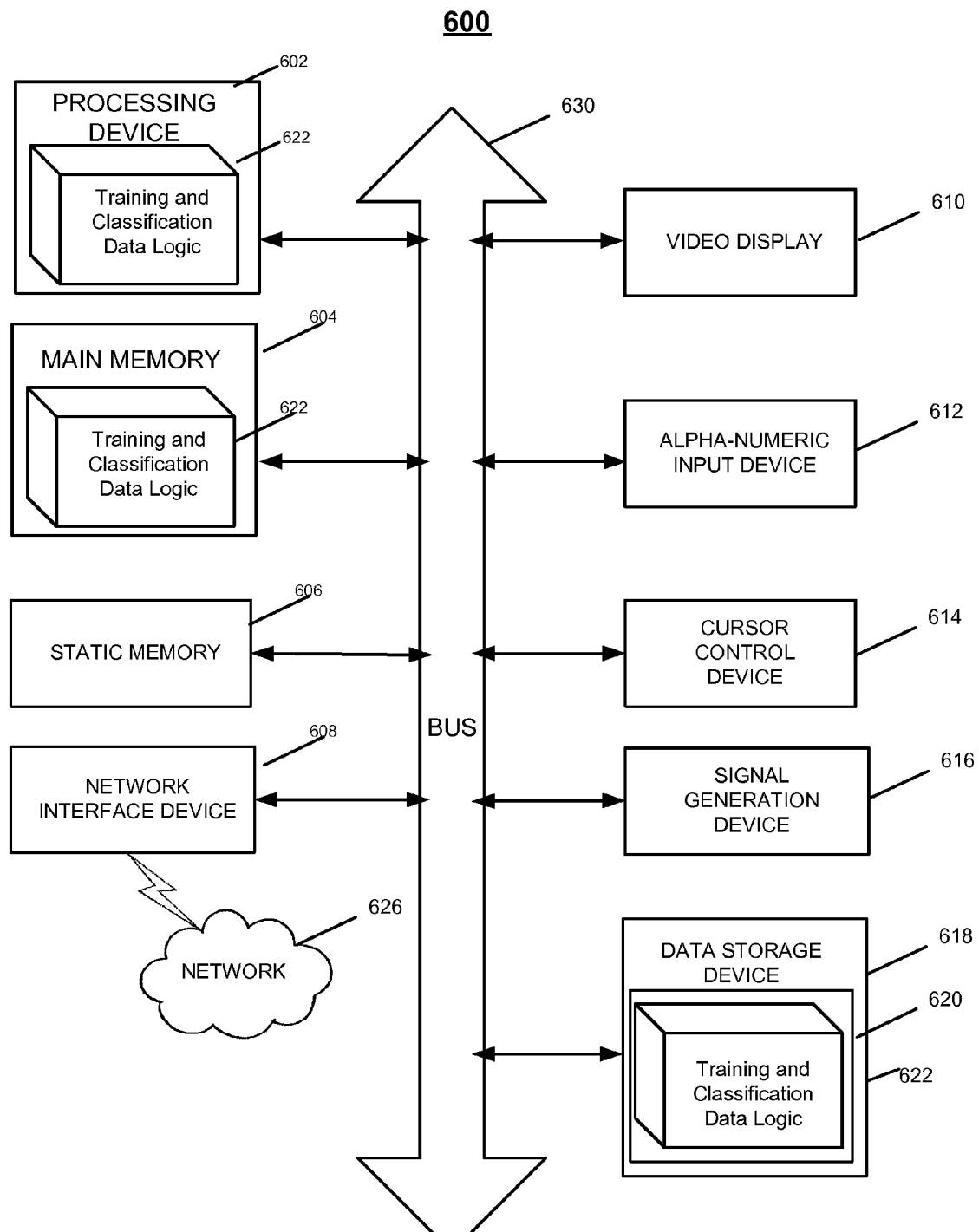
FIG. 6 illustrates a block diagram representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute training and classification data logic 622 for performing the operations and steps discussed herein. In one embodiment, the training data module 112 described with respect to FIGS. 2 and 4 perform the training data logic 622 and the classification data module 114 described with respect to FIG. 6 performs the classification data logic 622.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium (or more specifically a computer-readable storage medium) 620 on which is stored one or more sets of instructions (e.g. training and classification data module logic 622) embodying any one or more of the methodologies of functions described herein, such as method 600 for providing training and classification of data in a system described with respect to FIGS. 2, 4 and 6. The training and classification data module logic 622 may also reside, completely or at least partially, within the memory 605 and/or within the processing device 602 during execution thereof by the computer system 600; the memory 605 and the processing device 602 also constituting machine-accessible storage media.

The machine-readable storage medium 620 may also be used to store the training and classification data module logic 622 persistently containing methods that call the above applications. While the machine-accessible storage medium 620 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

The invention claimed is:

1. A method comprising:
   receiving, by a processing device, a data set, wherein the data set is annotated with at least a first annotation and at least a second annotation, wherein at least the first annotation and the second annotation represent characteristics within the data set;
   determining, by the processing device, a first identifier from the first annotation and a second identifier from the second annotation;
   associating, by the processing device, the first identifier to the second identifier to generate at least one joined identifier, wherein the at least one joined identifier is placed between the first annotation and the second annotation;
   computing, by the processing device, a feature weight and a transition weight for the annotated data set based on the first annotation, the second annotation, and the at least one joined identifier and a transition between each of the first annotation, the second annotation and the at least one joined identifier;
   receiving, by the processing device, a second data set, wherein the second data set is un-annotated; and
   classifying, by the processing device, the second data set based on the computed feature weight and the transition weight from the first data set.

2. The method of claim 1 further comprising providing the classified second data set to a user.

3. The method of claim 1 wherein the data set and the second data set comprise a plurality of sentences having a plurality of words.

4. The method of claim 3 wherein each of the first annotation and the second annotation comprise at least one word.

5. The method of claim 4 wherein the feature weight characterizes the words that occur in each of the first identifier, second identifier and the joined identifier.

6. The method of claim 3 wherein the classifying comprising assigning at least one class label to each of the sentences in the second data set.

7. The method of claim 1 wherein the first annotation is adjoining to the second annotation in the data set.

8. The method of claim 1 wherein the data set is one of a text, image, video and audio and the second data set is one of the text, image, video and audio.

9. The method of claim 1 wherein the transition weight characterizes the transition that occurs between each of the first identifier, the second identifier and the at least one joined identifier.

10. A system comprising:
    a memory;
    a processing device coupled to the memory, the processing device configured to:
      receive a data set, wherein the data set is annotated with at least a first annotation and at least a second annotation, wherein at least the first annotation and the second annotation represent within the data set;
      determine a first identifier from the first annotation and a second identifier from the second annotation;
      associate the first identifier to the second identifier to generate at least one joined identifier, wherein the at least one joined identifier is placed between the first annotation and the second annotation;
      compute a feature weight and a transition weight for the annotated data set based on the first annotation, the second annotation, and the at least one joined identifier and a transition between each of the first annotation, the second annotation and the at least one joined identifier;
      receive a second data set, wherein the second data set is un-annotated; and
      classify the second data set based on the computed feature weight and the transition weight from the first data set.

11. The system of claim 10 wherein the processing device is further configured to provide the classified second data set to a user.

12. The system of claim 10 wherein the data set and the second data set comprise a plurality of sentences having a plurality of words.

13. The system of claim 12 wherein each of the first annotation and the second annotation comprise at least one word.

14. The system of claim 10 wherein the first annotation is adjoining to the second annotation in the data set.

15. The system of claim 12 wherein the classify comprise assign at least one class label to each of the sentences in the second data set.

16. A non-transitory machine-readable storage medium including data that, when accessed by a machine, cause the machine to perform operations comprising:
    receiving, by a processing device, a data set, wherein the data set is annotated with at least a first annotation and at least a second annotation, wherein at least the first annotation and the second annotation represent characteristics within the data set;
    determining, by the processing device, a first identifier from the first annotation and a second identifier from the second annotation;
    associating, by the processing device, the first identifier to the second identifier to generate at least one joined identifier, wherein the at least one joined identifier is placed between the first annotation and the second annotation;
    computing, by the processing device, a feature weight and a transition weight for the annotated data set based on the first annotation, the second annotation, and the at least one joined identifier and a transition between each of the first annotation, the second annotation and the at least one joined identifier;
    receiving, by the processing device, a second data set, wherein the second data set is un-annotated; and
    classifying, by the processing device, the second data set based on the computed feature weight and the transition weight from the first data set.

17. The non-transitory machine-readable storage medium of claim 16, the operations further comprising providing the classified second data set to a user.

18. The non-transitory machine-readable storage medium of claim 16 wherein the data set and the second data set comprise a plurality of sentences having a plurality of words.

19. The non-transitory machine-readable storage medium of claim 18 wherein each of the first annotation and the second annotation comprise at least one word.

20. The non-transitory machine-readable storage medium of claim 18 wherein the classifying comprising assigning at least one class label to each of the sentences in the second data set.

* * * * *